2,117,584

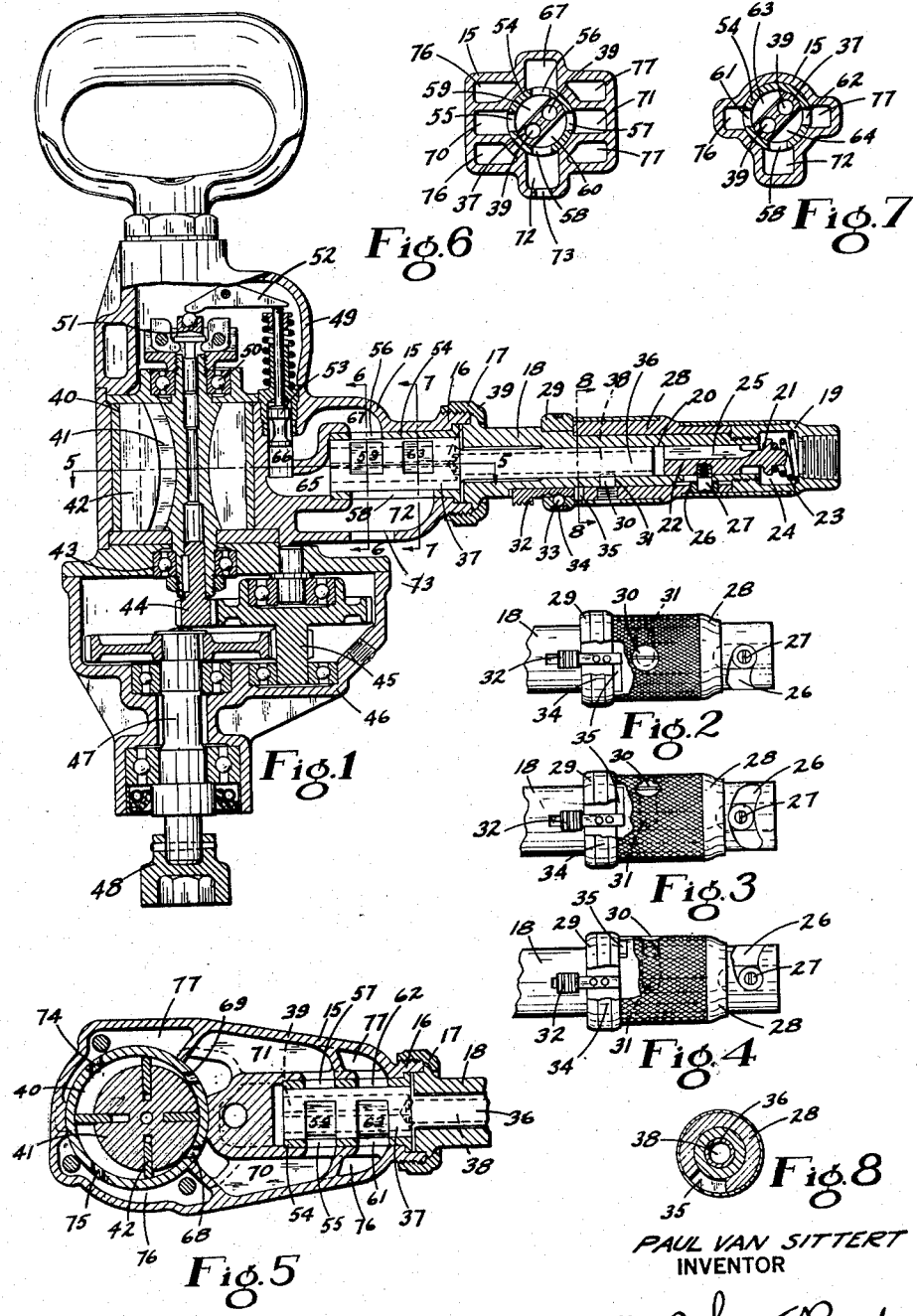

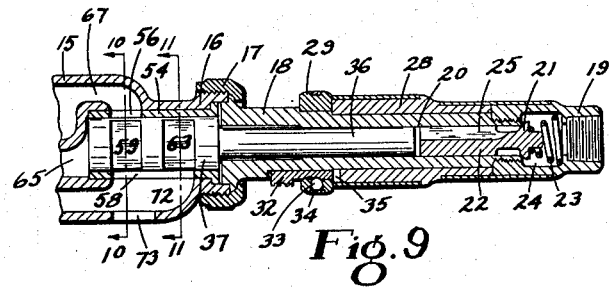
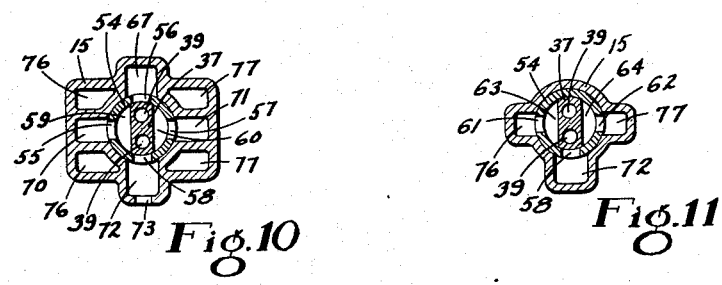
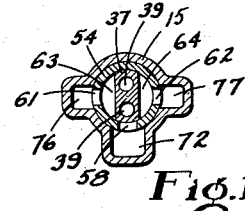
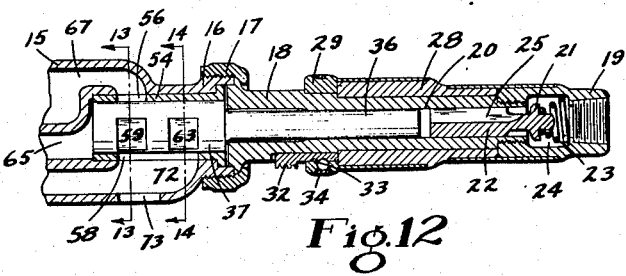
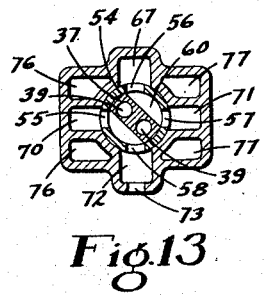
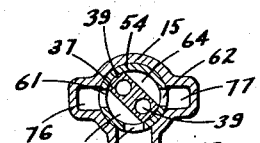
PAUL VAN SITTERT
INVENTOR
ATTORNEY Patented May 17, 1938

UNITED STATES PATENT OFFICE 2,117,584

REVERSIBLE MOTOR

Paul Van Sittert, South Euclid, Ohio, assignor to The Cleveland Pneumatic Tool Company, Cleveland, Ohio, a corporation of Ohio Application December 31, 1935, Serial No. 56,932

4 Claims. (Cl. 121—34)

This invention relates broadly to rotary motors, but more particularly to fluid actuated rotary motor of the reversible type.

One object of this invention is to produce a fluid actuated rotary motor of the reversible type with ports and passages arranged and disposed in a manner whereby the efficiency of the motor, irrespective of the direction of rotation thereof, is substantially equal to the highest efficiency heretofore obtained with similar motor of the non-reversible type.

Another object of this invention is to provide a fluid actuated motor of the reversible type with a hand grip operable for controlling the amount of motive fluid admitted into the motor as well as the direction of rotation of the latter.

Another object of this invention is to construct a fluid actuated motor of the reversible type wherein the parts are arranged and disposed in a manner producing a compact unit which is strong, durable, and efficient.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific constructions indicative of the scope and spirit of the invention.

In the drawings:

Fig. 1 is an elevational sectional view of a motor having the invention applied thereto.

Figs. 2, 3, and 4 are views illustrating a portion of the handle with the handle grip shown in different positions.

Fig. 5 is a longitudinal sectional view taken in a plane indicated by line 5—5 in Fig. 1.

Fig. 6 is a cross sectional view taken in a plane indicated by line 6—6 in Fig. 1.

Fig. 7 is a cross sectional view taken in a plane indicated by line 7—7 in Fig. 1.

Fig. 8 is a cross sectional view taken in a plane indicated by line 8—8 in Fig. 1.

Figs. 9 and 12 are views of the handle illustrated in Fig. 1, with parts thereof shown in different positions.

Figs. 10 and 13 are views similar to Fig. 6, illustrating parts in different positions.

Figs. 11 and 14 are views similar to Fig. 7, also illustrating parts in different positions.

Referring to the drawings in which like symbols designate corresponding parts through the several views, 15 respresents the main motor housing which extends laterally to terminate in a screw threaded portion 16 adapted to receive a nut 17, by which a handle 18 is rigidly affixed to the housing 15. To the end of the handle 18 is secured an inlet motive fluid connection 19. The handle 18 is formed with a bore 20, extending longitudinally therethrough, and having the further end thereof constituting a valve seat adapted to receive the head 21 of a poppet valve 22, which is slidably mounted therein. This valve is constantly urged toward its seat by a compression spring 23 interposed between the valve and the bottom of a cavity 24 formed within the inlet connection 19. The stem of the valve 22 is also provided with a slot 25 affording the communication of the bore 20 with the cavity 24. Cut through the side wall of the handle 18 adjacent the valve 22, there is an arcuated slot 26 having a pin 27 extending therethrough with one end rigidly secured within the stem of the valve 22. This slot is covered by a thin sleeve, which has been omitted in Figs. 2, 3, and 4 to better illustrate the slot 26. The other end of the pin 27 is fitted within a sleeve 28, which is rotatably mounted on the handle 18 between the inlet connection 19 and a collar 29, which is also mounted on the handle. The sleeve 28 carries a screw 30 which extends into the handle bore 20 through a slot 31 formed through the side wall of the handle. Slidably mounted within a key slot longitudinally disposed within the handle 18 and collar 29, there is a key 32 having detents adapted to receive a ball 33 carried by the collar 29 and constantly urged in engagement with the detents by a spring clip 34 mounted on the collar 29. The end of the key 32 is adapted to protrude into a cut away portion or slot 35 provided in the end wall of the sleeve 28. Disposed within the bore 20 of the handle 18, there is the stem 36 of a cylindrical valve 37 which is rotatably mounted within a bushing 54 rigidly secured within the housing 15. The stem 36 is affixed to the sleeve 28 for rotation therewith by the screw 30, and is also provided with a longitudinally disposed bore 38 opening into two smaller ports 39 formed through the cylindrical valve 37.

The casing 15 is provided with a rotor chamber 40, having a rotor 41 mounted therein in line contact with the inner wall of the chamber for rotation in either direction. This rotor has the usual blades 42 radially movable therein and capable of substantially fluid tight engagement with the inner wall of the chamber 40. At its lower end, the rotor shaft is guided within a ball bearing 43, and has secured thereto a gear 44, which constitutes the driving pinion of a speed reduction mechanism 45 enclosed within a front casing 46. Through the mechanism 45, rotation at a reduced rate of speed is transmitted to a spindle or shaft 47 having a work receiving member or socket 48 detachably secured thereto. The other end of the rotor shaft extends into a rear housing 49 where it is supported within a ball-bearing 50, and has adequately mounted thereon a speed governor 51, which is associated, through a pivotally mounted lever 52, with a throttle valve 53, the latter being slidably mounted within the casing 15 for the purpose hereinafter described.

The bushing 54 within which the cylindrical valve 37 is rotatably mounted, is formed toward its left end in Fig. 1 with a plurality of rectangular passages 55, 56, 57, and 58, disposed at right angles with each other and capable of intercommunication through two flats 59 and 60 formed on the valve 37. Toward the right end in Fig. 1, the bushing 54 is provided with two other passages 61 and 62 disposed at 180° from each other, and having the passage 58 extending therebetween. This last passage is capable of communication with either the passage 61 or 62 through two flats 63 and 64 formed on the valve 37. Surrounding the bushing 54, the housing 15 is formed with a plurality of passageways cored therein, including a passageway 65 leading from the end of the valve 37 to a vertical chamber 66 within which the valve 53 is slidably mounted. This last chamber is capable of communication with the passage 56 formed through the bushing 54, through a passageway 67. The motive fluid may be admitted into the rotor chamber 40 through either a port 68 or 69, the former being in communication with the passage 55 formed in the bushing 54 through a passageway 70, while the latter is in communication with the bushing passage 57 through a passageway 71. The relatively long passage 58 formed in the bushing 54 is in constant communication with the atmosphere through a cavity 72 and port 73. Motive fluid may exhaust from the rotor chamber 40 through two ports 74 and 75, the former leading to the valve bushing passage 62, through a passageway 77, while the latter is leading to the bushing-passage 61 through a passageway 76.

In the operation of the motor, let it be assumed that the handle sleeve 28 has been rotated into the position shown in Fig. 2, thus causing the pin 27 engaging the side walls of the slot 26 to move the throttle valve head 21 away from its seat, and thereby permitting the admission of the pressure fluid from the inlet connection 19 into the handle bore 20 via the throttle valve slot 25. When the handle sleeve 28 is positioned as shown in Fig. 2, the cylindrical valve 37, due to its association with the sleeve 28 through the screw 30, is positioned as shown in Figs. 6 and 7. Motive fluid now admitted into the handle bore 20 is free to flow through the valve bore 38 into the passageway 65 via the small ports 39. From the passageway 65, the motive fluid is admitted into the valve bushing passage 56 via the vertical chamber 66 and passageway 67, from where it is admitted into the passageway 70 via the flat 59 formed on the valve 37 and the valve bushing passage 55. From the passageway 70, the motive fluid is admitted into the rotor chamber 40 through the port 68, thus exerting pressure on the blades 42 to affect the rotation of the rotor in a clockwise direction in Fig. 5. In this instance, the exhaust port 75 is rendered ineffective by the throttle valve 37, which is positioned to prevent communication between the valve bushing-ports 61 and 58, thus preventing the exhaust of the motive fluid from the rotor chamber 40, via the port 75, passageway 76, valve bushing ports 61 and 58, cavity 72 and exhaust port 73. The motive fluid is thereby permitted to remain in the rotor chamber 40 and act on the blades 42 until the blade having the motive fluid acting thereon, finally uncovers the port 74. Thereafter, the motive fluid is free to exhaust from the rotor chamber 40 to the atmosphere via the port 74, passageway 77, valve bushing passage 62, valve flat 64, valve bushing passage 58, cavity 72 and the exhaust port 73. In the event a portion of the motive fluid should remain entrapped into the rotor chamber 40 between the ports 74 and 69, it is free to escape therefrom to the atmosphere via the port 69, passageway 71, valve bushing passage 57, valve flat 60, valve bushing passage 58, cavity 72 and exhaust port 73.

When the handle sleeve 28 is rotated in the position shown in Fig. 3, the camming action of the side walls of the slot 26 on the pin 27, will cause the throttle valve head 21 to move in fluid tight engagement with its seat as shown in Fig. 9, preventing thereby the admission of the motive fluid into the motor. During this position of the throttle valve 22, the cylindrical valve 37 is positioned as shown in Figs. 10 and 11, that is, in closed position relative to the different passages within the valve bushing 54. In this instance, the further rotary movement of the handle sleeve 28 from the position shown in Fig. 3 to the position shown in Fig. 4, is prevented due to the engagement of the end of the key 32 with the side wall of the slot 35 formed in the end wall of the sleeve 28. This safety device is provided to preclude an accidental rotation of the handle sleeve 28 into the position causing the reversed rotation of the motor. Consequently, when it is desired to rotate the handle sleeve 28 in the position shown in Fig. 4, it is first necessary to slide the key 32 toward the left in Fig. 2 out of engagement with the side wall of the slot 35.

During the rotation of the handle sleeve 28 from the position shown in Fig. 3 to the position shown in Fig. 4, the side walls of the slot 26 again engaging the pin 27, will cause the latter to move the throttle valve 22 in the open position shown in Fig. 12, permitting thereby the motive fluid to be admitted into the handle bore 20 as previously explained. During this rotation of the handle sleeve 28, the cylindrical valve 37, due to its association with the sleeve 28 through the screw 30, is also rotated in the position shown in Figs. 13 and 14. The motive fluid is now free to flow into the passageway 67 in the manner previously described, from where it is admitted into the rotor chamber 40 via the valve bushing passage 56, valve flat 60, valve bushing passage 57, passageway 71 and port 69. The motive fluid thus admitted into the rotor chamber 40, will act on the blades 42 to impart rotation to the rotor in a counterclockwise direction in Fig. 5. In this instance, the motive fluid is prevented to exhaust through the port 74, passageway 77, and valve bushing 62, since the communication of the latter with the exhaust port 73 via the valve bushing passage 58 and passageway 72, is prevented by the valve 37. After the blade, on which motive fluid exerts pressure, uncovers the port 75, the motive fluid is free to exhaust to the atmosphere via the port 75, passageway 76, valve bushing passage 61, valve flat 63, passage 58, passageway 72 and exhaust port 73. In the event a portion of the motive fluid should remain entrapped in the rotor chamber 40 between the ports 75 and 68, it is free to exhaust to the atmosphere via the port 68, passageway 70, passage 55, valve flat 59, passage 58, passageway 72 and exhaust port 73.

The inlet ports 68 and 69 as well as the outlet ports 74 and 75, are arranged and disposed relative to the blades 42 in a manner affording the efficiency of the motor, irrespective of the direction of rotation thereof, to be equal to the maximum efficiency heretofore obtained in fluid actuated rotary motor of the non-reversible type. Referring to Fig. 5 for instance, it will be seen that the pocket formed between the blades 42 are of a varying volumetric capacity due to the eccentric relation of the rotor 41 with the center axis of the chamber 40. It will also be noticed that the inlet of the motor fluid into the said pocket, is cut off before the latter reaches its maximum volumetric capacity, permitting thereby the motive fluid therein to expand until the pocket reaches its maximum volume. Immediately thereafter, the motive fluid is allowed to exhaust from the pocket before it is compressed therein due to a reduction in the volumetric capacity of the pocket, producing thereby a motor of very high efficiency, which may well be equal to that of a motor of the non-reversible type.

The rotation of the rotor 41 is transmitted to the driving pinion 44, which in turn transmits rotation at a reduced rate of speed to the shaft 47 through the gear transmission 45, thus imparting rotation to the work receiving member 48 secured at the end of the shaft 47. The speed of rotation of the motor is automatically regulated by the centrifugal governor 51, which causes through the lever 52, the slidable movement of the valve 53 within the vertical chamber 66 for effecting a more or less complete communication of the passageway 65 with the passageway 67, thereby controlling the amount of the motive fluid admitted into the rotor chamber 40.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a fluid actuated rotary motor of the reversible type, the combination of a rotor chamber, a rotor within said chamber mounted in eccentric relation with the center axis thereof for rotation in either direction, a plurality of blades carried by said rotor capable of substantially fluid tight engagement with the inner wall of said chamber and forming between them pockets of varying volumetric capacity, means for actuating said rotor comprising two sets of passages opening into said chamber each set including an inlet passage capable of admitting motive fluid successively into each of said pockets and an exhaust passage located for successive communication with each of said pockets immediately after the volumetric capacity thereof has reached its maximum, a centrifugally actuated speed governor, and means operable for selectively controlling the direction of rotation of said rotor including a valve member having motive fluid flowing therefrom to said governor to be controlled thereby and returned therefrom into said valve member to be admitted therefrom into said rotor chamber for actuating said rotor in either direction, said valve member being positionable for closing the exhaust passage of one of said sets and causing the inlet passage thereof to act as an exhaust passage by opening the same to the atmosphere while the exhaust and inlet passages of the other set are normally open by said valve member.

2. In a fluid actuated rotary motor of the reversible type, the combination of a rotor chamber, a rotor within said chamber mounted in tangential engagement with the inner wall thereof for rotation in either direction, a plurality of elements carried by said rotor capable of substantially fluid tight engagement with the inner wall of said chamber and forming between them pockets of varying volumetric capacity, means for admitting and exhausting motive fluid into and out of said chamber for actuating said rotor including a duality of ports opening into said chamber one located on each side of the tangential engagement aforesaid in equal space relation therewith, a duality of passages opening into said chamber located one on each side of said engagement with the distance between said passages taken on the inner wall of said chamber equal to the corresponding distance between said element when the pocket between them has reached its maximum volumetric capacity, a centrifugally actuated speed governor, and means for selectively controlling the direction of rotation of said rotor including a valve member having motive fluid flowing therefrom to said governor to be controlled thereby and returned therefrom to said valve member to be admitted therefrom into said rotor chamber for actuating said rotor in either direction, said valve member being positionable for simultaneously establishing connection of one of said ports with a motive source of supply, closing the passage adjacent to said port, and opening the other of said port and passage to the atmosphere.

3. In a fluid actuated rotary motor of the reversible type, the combination of a rotor chamber having a rotor rotatable therein in either direction, blades carried by said rotor forming between them pockets varying in size during the rotation of said rotor, a port located within each quadrant of the inner peripheral wall of said chamber, two of said ports located within adjacent quadrants constituting inlet ports capable of conveying motive fluid into said pockets for actuating said rotor by acting on said blades, the other two ports constituting exhaust ports for the motive fluid admitted into said chamber, said exhaust ports being located on the edges of the greatest pocket possibly formed between said blades, a centrifugally actuated speed governor, a throttle valve admitting motive fluid to said governor to be controlled thereby, and means including said throttle valve for controlling the admission of the motive fluid from said governor through one or the other of said inlet ports and for rendering ineffective the exhaust port located within the quadrant adjacent to that of the inlet port conveying motive fluid into said chamber, allowing thereby the exhaust of the motive fluid to take place successively immediately after each of said pockets reaches its maximum size.

4. In a fluid actuated rotary motor of the reversible type, the combination of a housing formed with a chamber having a rotor mounted in eccentric relation with the inner wall thereof for rotation in either direction, said chamber defining two half portions of identical configuration, a plurality of elements carried by said rotor forming between them pockets varying in size during the rotation of said rotor, an inlet port within each of said half portions capable of admitting motive fluid into said pockets for actuating said rotor by acting on said elements, an outlet port within each of said half portions located on the further edge of the greatest pocket possibly formed between said elements during the rotation of said rotor due to the admission of the motive fluid through the inlet port located within the half portion other than that of said outlet port allowing thereby the motive fluid to exhaust through the latter immediately after each of said pockets reaches its maximum size, a centrifugally actuated speed governor, a throttle valve admitting motive fluid to said governor to be controlled thereby, and means including said throttle valve for selectively controlling the admission of the motive fluid from said governor through one or the other of said inlet ports and for simultaneously closing the outlet port located within the same half portion as that of the inlet port admitting the motive fluid into said pockets.

PAUL VAN SITTERT.